United States Patent [19]

Morse et al.

[11] Patent Number: 4,727,303
[45] Date of Patent: Feb. 23, 1988

[54] POSITIONAL CONTROL METHOD AND SYSTEM UTILIZING SAME

[75] Inventors: Richard A. Morse; Chia P. Day, both of Troy; Kenneth A. Stoddard, Rochester, all of Mich.

[73] Assignee: GMF Robotics Corporation, Auburn Hills, Mich.

[21] Appl. No.: 865,763

[22] Filed: May 22, 1986

[51] Int. Cl.$^4$ .............................................. G05B 5/01
[52] U.S. Cl. ....................................... 318/616; 318/631
[58] Field of Search ............... 318/616, 617, 631, 561

[56] References Cited

U.S. PATENT DOCUMENTS

| | | | |
|---|---|---|---|
| 4,374,349 | 2/1983 | Inaba et al. | 318/568 M |
| 4,463,297 | 7/1984 | Bennett et al. | 318/561 |
| 4,488,098 | 12/1984 | Shimonou | 318/616 X |
| 4,500,823 | 2/1985 | Walrath | 318/561 X |
| 4,507,594 | 3/1985 | Takemoto | 318/561 X |
| 4,540,923 | 9/1985 | Kade et al. | 318/631 X |
| 4,612,489 | 9/1986 | Gunda | 318/561 X |

Primary Examiner—Benjamin Dobeck
Attorney, Agent, or Firm—Brooks & Kushman

[57] ABSTRACT

A control system and method including an integrator coupled with a rate-varying multiplier which operate in parallel with a conventional controller. Because the integration is rate-variable, the resulting control system has the benefits of an integral position control without the problems of integral windup and subsequent overshoot. The system and method have less following and steady state error, faster settling time and better tolerance to noise than traditional PD and PID controls in controlling dynamic manipulators such as robots. Also, because the integrations are performed in a rate-variable manner, errors due to mechanical static friction, i.e. "sticktion", are substantially reduced without sacrificing dynamic performance of the system.

13 Claims, 7 Drawing Figures

Fig. 4
$$\begin{cases} \theta e_k = \theta r_k - \theta o_k \\ RVI_k = (RVI_{k-1} + K_i \cdot \theta e_k) \cdot \left(\dfrac{a}{a+w_k^2}\right) \\ U = K_p(\theta e_k) - K_v(w_k) + RVI_k \end{cases}$$
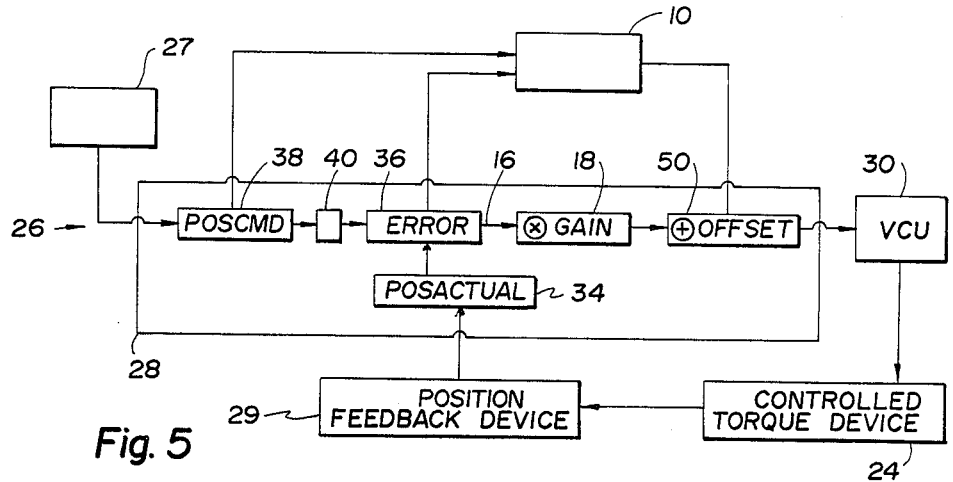
Fig. 5
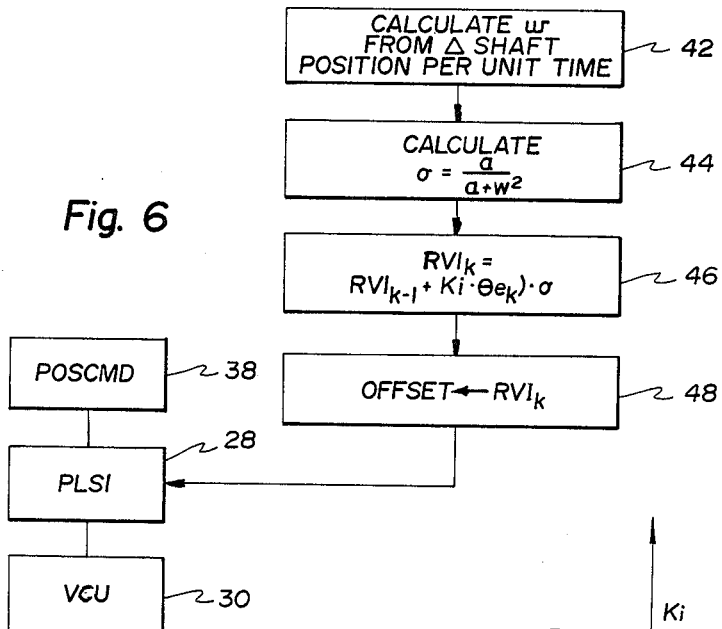
Fig. 6
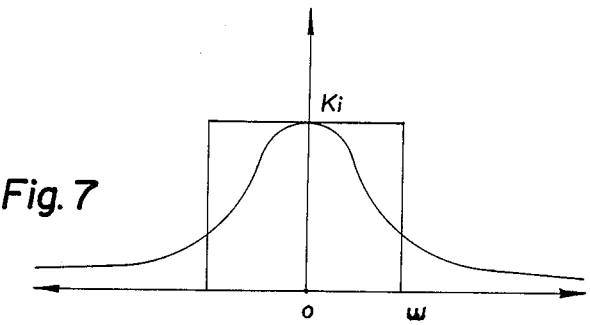
Fig. 7

POSITIONAL CONTROL METHOD AND SYSTEM UTILIZING SAME

TECHNICAL FIELD

This invention relates to positional control methods and systems utilizing same and, in particular, to non-linear positional control methods and systems utilizing same for use in controlling dynamic manipulators.

BACKGROUND ART

Sticktion is a phenomenon which occurs in a slow-moving mechanical apparatus. Sticktion often occurs during the control of torque devices to position heavy mechanisms. It is a sharp rise in coulomb friction due to micro-welds formed between two sliding surfaces. This has been modeled as a step in coulomb friction from zero velocity to some small "breakaway" velocity value, and the complement in the opposite direction. This creates a constant force resisting the motion until a minimum "breakaway" velocity is reached.

Conventional linear controllers can be optimized for a given inertial load and viscous frictional drag. Since they are tuned to a specific set of parameters, these controllers react sub-optimally when the actual system parameters change. The controller's ability to perform under these changing parameters is characterized as its "robustness".

A robot is a special type of controlled torque device which is often utilized to position heavy mechanisms. The number of joints of commercially available robots varies from three to seven. Typically they have six joints, giving six degrees of freedom, with a gripper which is referred to as a hand or an end effector. Each joint of the robot is positionally controlled with a feedback loop. Typically the device control is done entirely at the joint level. High-level path control of position and orientation of the hand is done in Cartesian coordinates.

Most robot controllers use a proportional-derivative type of control method. Such a control is generally termed a PD control. A PD control keeps each robot axis in control by taking position error information multiplied by a constant and adding the resulting amount to the velocity multiplied by another constant. The major advantages of this system is its stability over a wide range of operating conditions. The disadvantages of such a system are a large amount of following error and steady state error.

Typically, such errors affect robot coordinated motions and repeatability up to one millimeter or more. In many applications in robotics, such a large repeatability figure is intolerable and expensive tooling modifications are needed to compensate for it.

Other techniques used by some manufacturers and research laboratories include the use of an integrator to compensate for the shortcoming of the PD controls. The resulting control is called a proportional-integrator-derivative or PID control. PID controls have the advantage of eliminating steady state error. However, PID controls have the disadvantages of difficulty in tuning the parameters, overshoot and oscillations.

The U.S. Patent to Kubo et al U.S. Pat. No. 3,781,626 disclosed an optimized PID controller. Control coefficients are generated by a computing network which are used to modify the operation of the central control unit is response to the changing characteristics of the remote control device.

The U.S. Patent to Kurakake discloses a position control system having a closed loop in which an integrating element and a device for compensating for unstableness of the closed loop caused by the integrating element are provided.

The U.S. Patent to Inaba et al U.S. Pat. No. 4,374,349 discloses a control circuit including an error register. When the error value within the error register becomes higher than a predetermined value, the multiplication factor of the position gain multiplier is increased.

The U.S. Patent to Pollard et al U.S. Pat. No. 4,362,978 discloses a control system utilizing a variable inertia scaling factor accomplished through the use of a look-up table with appropriate interpolation table entries.

The U.S. Patent to Dunne U.S. Pat. No. 4,510,428 discloses a control system for a hydraulic actuator wherein variable inertia scaling of selected loop command signals is provided.

Other United States patents disclosing various control circuits include the U.S. Patents to Kade et al U.S. Pat. No. 4,540,923, Salemka U.S. Pat. No. 4,498,036, Chitayat et al U.S. Pat. No. 4,494,060, Cook et al U.S. Pat. No. 4,491,718 Crimshaw U.S. Pat. No. 4,479,176, Bennett et al U.S. Pat. No. 4,463,297, Whitney et al U.S. Pat. No. 4,458,321, Takemoto U.S. Pat. No. 4,507,594, Mitsuoka U.S. Pat. No. 4,437,045, Kolell et al U.S. Pat. No. 4,041,287 and Engelberger et al U.S. Pat. No. 4,132,937.

It is desirable that a controlled torque device have the following steady state performance criteria (1) a zero error; (2) fast rise and settling times, (3) little to no overshoot, and (4) a robust reaction to disturbance and sticktion. The accomplishment of criteria (1) and (4) is often accomplished by providing a high gain linear integrator in the subject control system. However, this results in losing the second and third performance criteria which are high-speed dynamic response characteristics. Criteria (1) and (4) are typically low-speed, steady state criteria.

DISCLOSURE OF THE INVENTION

An object of the present invention is to provide a positional control method and system to improve robot accuracy and repeatability while, at the same time, eliminating errors caused by friction and sticktion and errors due to drifts in the electronics controlling the drive motors.

Another object of the present invention is to provide an improved positional control method and system wherein a non-linear integrator is added in parallel to a conventional control system so that at high speeds the non-linear integrator is tuned low so that smooth tracking is accomplished without oscillation and wherein at low speeds the non-linear integration portion is tuned so that the steady state error is substantially reduced and wherein there is a relatively smooth transition between the high and low speeds without generating a stability problem.

Yet still another object of the present invention is to provide an improved positional control method and system including a rate-variable integrator (i.e. RVI) which achieves the benefits of an integral position control with substantially reduced integral "wind up" and overshoot.

In carrying out the above objects and other objects of the present invention in a control system adapted to control a motor having an output shaft so that the shaft moves in response to a position command signal, a method is provided for controlling the motor including the steps of generating a position feedback signal related to the position of the shaft and generating a velocity signal relating to the velocity of the shaft. The method further comprises the steps of combining the position command signal and the position feedback signal to obtain a position error signal and calculating a first control signal related to the position error signal. Also included are the steps of integrating the position error signal multiplied by a function of the velocity signal to obtain a second control signal and combining the first and second control signals to obtain an equivalent resultant control signal. When the value of the shaft velocity is relatively high, the contribution of the second control signal to the resultant control signal is negligible. The second control signal only makes a significant contribution to the resultant output signal when the value of the shaft velocity is relatively low.

Further in carrying out the above objects and other objects of the present invention, a positional control system to control a motor having an output shaft is provided. The system comprises first generating means for generating a position feedback signal related to the position of the shaft, second generating means for generating a function related to the velocity of the shaft and first combining means for combining the position command signal and the position feedback signal to obtain a position error signal. The system further comprises calculating means for calculating a first control signal related to the position error signal and integrating means for integrating the position error signal multiplied by a function of the velocity signal to obtain a second control signal. Also included is a second combining means for combining the first and second control signals to obtain an equivalent resultant control signal. When the value of the shaft velocity is relatively high, the contribution of the second control signal to the resultant control signal is negligible. The second control signal only makes a significant contribution to the resultant control signal when the value of the shaft velocity is relatively low.

Preferably, integrating is performed in a digitally recursive fashion and the velocity signal is determined from the distance moved by the shaft in a relatively small time period. The function of the velocity signal is a continuous function of the shaft velocity and the value of the function approaches zero as the shaft velocity approaches infinity. The value of the function has a finite positive value when the shaft velocity has a zero value.

The advantages accruing to a positional control method and system as described above are numerous. For example, a torque device, such as a robot used to position a heavy mechanism, may be controlled to have the following steady state performance criteria: (1) a zero error; (2) fast rise and settling times; (3) little to no overshoot; and (4) a robust reaction to disturbance and sticktion. By providing an integration scheme which is rate variable, the benefits of integral position control are obtained without integral "wind ups" and overshoot. Such a control method and system consequently may be incorporated into conventional robot and/or machine tool position controllers.

BRIEF DESCRIPTION OF THE DRAWINGS

FIG. 4 illustrates a number of equations utilized to illustrate the rate variable integration control portion of the positional control method and system;

FIG. 5 is a block diagram illustrating the incorporation of the positional control method and system of the present invention in a conventional PD control;

FIG. 6 is a block diagram illustrating the steps taken in the positional control method of the present invention for use in the conventional PD contro; and FIG. 7 is a graph illustrating a preferred rate-variable function for use in the positional control method and system of the present invention.

PEST MODE FOR CARRYING OUT THE INVENTION

Figure 1:
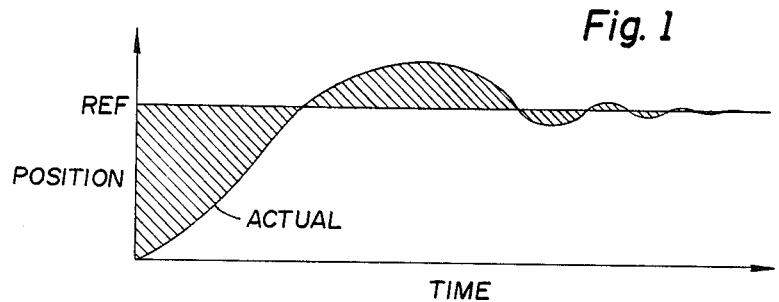
FIG. 1 is a first graph illustrating the transient and steady state performance of a torque device used to position a heavy mechanism, the graph illustrating relatively slow rise and long settling times, wherein the cross-hatched areas illustrate the error and wherein there is a relatively large amount of overshoot and oscillation.
Figure 2:
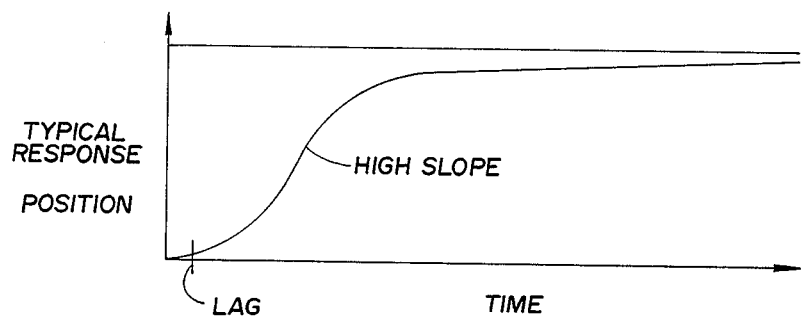
FIG. 2 is a second graph illustrating the transient and steady state performance of the torque device, the graph illustrating a non-zero steady state error and a particularly non-robust reaction to sticktion.

Referring now to the drawings, there is graphically illustrated in FIGS. 1 and 2, some of the steady state performance characteristics which are improved by the positional control method and system of the present invention. Such a positional control system and method is particularly useful in controlling the position of relatively heavy mechanical systems, especially those with sliding parts. In particular, the positional method and control system of the present invention can be utilized with robot and machine tool position controllers.

FIG. 1 illustrates performance if a torque device with and settling times and over-shoot. As previously mentioned, these performance characteristics can be improved by utilizing a high gain PD controller which is clamped at some maximum torque. Such a controller can typically approach a "bang-bang" minimum time performance. In such a controller, position error information is multiplied by a constant and then added to a velocity multiplied by another constant to keep each axis in control. A major advantage of this type of position control system is its ability to adapt to a wide range of operating conditions. The disadvantages of such a system are the relatively large amount of following and steady state error. Such errors effect robot coordinated motions and repeatability up to one millimeter or more. In many robotics applications such a repeatability figure is intolerable and extensive tooling modifications are needed to compensate for it.

FIG. 2 illustrates steady state performance characteristics due to disturbance and sticktion. As previously mentioned, an integrator may be utilized to compensate for these two performance characteristics in what is commonly called a PID type control system. Such control systems eliminate steady state error. However, such control systems have the disadvantages of difficulty in tuning the parameters, overshoot and oscillation as exemplified in FIG. 1.

Figure 3:
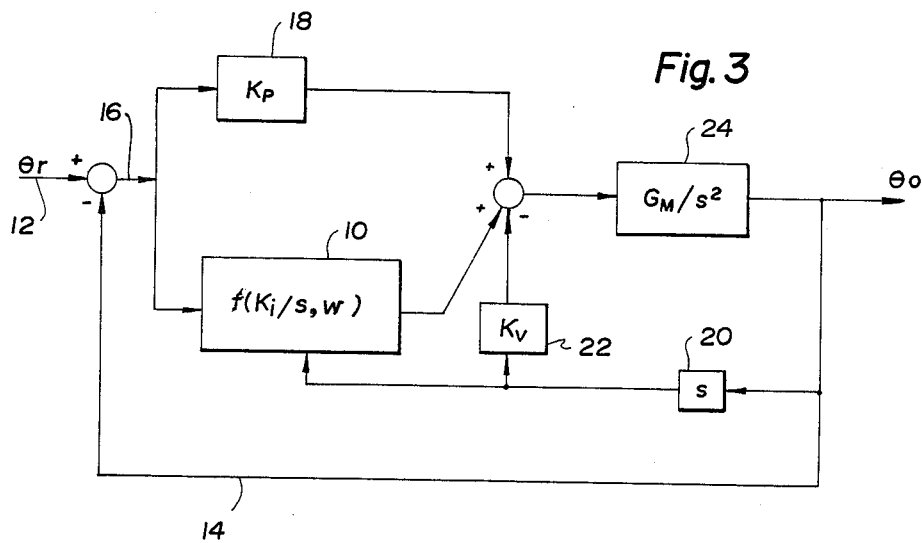
FIG. 3 is a transfer function in block diagram form of a positional control method and the system utilizing same constructed in accordance with the present invention.

Referring now to FIG. 3, there is illustrated a block diagram of the various transfer functions of the positional control method and system of the present invention. Block 10 comprises a velocity dependent integrating function, which eliminates integral "windup" and overshoot. The function comprises an integrator coupled with a rate-varying multiplier (i.e. RVI). Preferably, the function is solved in a digitally recursive fashion by solving the equations of FIG. 4.

A desired or reference displacement signal, $\theta_r$, apperas on line 12 from which there is subtracted the actual displacement signal, $\theta_o$, which appears on line 14. A resulting position error signal $\theta_e$, appears on line 16, which is multiplied by a constant, $K_p$, as illustrated at block 18 which comprises the proportional gain of a conventional PD control. The actual displacement may be measured by a device, such as an optical encoder or pulse coder, which provides positional feedback of the angular displacement of the actuator shaft.

The error signal on line 16 is also input into the block 10 which, as previously mentioned, is the transfer function form of the rate variable integrator (RVI) control portion of the system. The control portion of block 10 utilizes the output of a differentiator block 20 which differentiates the actual displacement of the output shaft to be controlled.

The output of the differentiator block 20 is also utilized by a block 22 which comprises a velocity gain coefficient, $K_v$, which is utilized in the control for damping purposes. A resultant control input signal, U, as defined by the third equation in FIG. 4, is then fed into block a 24 which represents the transfer function of a positional servo actuator with the output drive or actuator shaft.

Referring now to FIGS. 5 and 6 there is illustrated the RVI control system and method in a conventional digital positional control, such as a PD control, generally indicated at 26. A high-level signal generator 27 generates a positional command signal. In response to the position command signal, in general, a block 28 of the PD control 26 generates an offset at each interpolation time interval (e.g. eight milliseconds) for use by a velocity control unit or VCU 30 which, in turn, provides a velocity command to the positional servo actuator 24.

An optical positional feedback mechanism, such as an optical encoder or pulse coder 29 provides a signal to the PD control 28 relating to the angular displacement of the actuator shaft of the servo actuator 24. The actual position of the output shaft is stored in a buffer register 34 which may be used to increment or decrement an up-down counter or register 36 of the control 28.

The position command signal is stored in a buffer 38 and is thereafter converted by a pulse generator 40 to a signal which the error register 36 can utilize. Thereafter, the error signal which appears on line 16 is multiplied by the gain or block 18 to provide an uncompensated velocity command.

Referring now to FIG. 6, there is illustrated the steps taken within the block or RVI control 10. Because, in the specific example shown, there is no direct angular velocity measurement in the control 26, at block 42 the velocity of the output shaft is derived from the incremental position input and the position error. The velocity comprises the change in actual position of the output shaft during each interpolation time interval (i.e. which in the example illustrated is eight milliseconds). However, it is to be understood that the velocity could be directly generated without departing from the spirit of the present invention.

The step illustrated by block 44 comprises the formation of the rate-varying factor, $\sigma$, from a constant, a, and the square of the angular velocity, w. The constant, a, is a factor which controls the velocity band-width of the control 10. It is to be understood that the rate varying factor $\sigma$, may comprise any continuous function of the angular velocity: (1) having an infinite number of derivatives; (2) which equals 1 or some constant, $K_i$, when the velocity equals zero; and (3) which, in the limit, equals zero as the velocity goes to ±infinity. Also, always is a positive number. As illustrated in FIG. 7, $\sigma$ comprises a continuous function to allow a smooth transition to automatically increase or decrease the use of the integrator in the control without generating stability problems.

After formation of the value for at block 44, the control output from the RVI part of the control system is calculated at block 46. The control output is formed by multiplying $\sigma$ by the sum of the previous control output and the previous positional error signal multiplied by the constant $K_i$.

As illustrated at block 48, the resulting control output from the RVI part of the control system is combined with the uncompensated offset contained in the offset register 50. The resulting value, in turn, is provided as an offset to the velocity command signal in the VCU 30. As can be readily appreciated, the offset signal may alternatively be summed with a torque command which is then added as an offset to the torque at the controlled motor.

The constant, a, which is a gain factor is preferably set up as a system variables so that the operator can vary the steady state performance of the system. The RVI portion of the control system is only effectively active at low speeds and, consequently, allows for the tuning of the high-speed dynamics separately from the steady state performance. The constant, a, of the RVI control portion determines the cutoff velocity between what is high and what is low speed.

At speeds above the "bandwidth" of the RVI control portion, the system dynamics are governed by linear viscous dampening effects and the other linear control algorithms. Thus the high-speed dynamics can be tuned near critically damped with a high gain PD control. At speeds below the "bandwidth" of the RVI control portion, the integral feedback of the RVI control portion becomes a determining factor to the system dynamics and robustness characteristics of the system. At that point, the steady state and stiffness or "robustness" of the system is controlled by the gain of the RVI integrator.

The positional control method and system as above has numerous benefits. For example, the RVI control system improves accuracy and repeatability during the control of the position of a relatively heavy mechanical system, such as a robot and/or a machine tool. Consequently, errors caused by friction and sticktion and errors due to drifts in the electronics controlling the motors which power the mechanical system are substantially reduced. Also, repeatability and settling time are improved.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. In a control system adapted to control a motor for driving a load in response to a position command signal which defines a desired load position, a method for controlling the motor comprising the steps of:

generating a position feedback signal related to the position of the load;

generating a function of the velocity signal related to the velocity of the load;

combining the position command signal and the position feedback signal to obtain a position error signal;

calculating a first control signal related to the position error signal;

integrating the position error signal multiplied by the function of the velocity signal to obtain a second control signal; and combining the first and second control signals to obtain an equivalent resultant control signal wherein when the value of the load velocity is sufficiently high to overcome the effects of sticktion on the motion of the load, the contribution of the second control signal to the resultant control signal is negligible and wherein the second control signal only makes a significant contribution to the resultant output signal when the value of the load velocity is at such a low level that sticktion impinges on the motion of the load.

2. In a PD type of controller for controlling the position of a joint of a robot through its respective motor by providing a first control signal related to a position error signal, a method for increasing the positional accuracy of the controller comprising the steps of:

generating a function of the velocity signal related to the velocity of the load;

integrating the position error signal multiplied by the function of the velocity signal to obtain a second control signal; and combining the first and second control signals to obtain an equivalent resultant control signal wherein when the value of the load velocity is sufficiently high to overcome the effects of sticktion on the motion of the load, the contribution of the second control signal to the resultant control signal is negligible and wherein the second control signal only makes a significant contribution to the resultant control signal when the value of the load velocity is at such a low level that sticktion impinges on the motion of the load.

3. The method as claimed in claim 1 or claim 2 wherein said step of integrating is performed in a recursive fashion.

4. The method as claimed in claim 1 or claim 2 wherein said step of integrating is performed in a digitally recursive fashion.

5. The method as claimed in claim 1 or claim 2 wherein said step of generating the function of the velocity signal includes the step of determining the distance moved by the load in a relatively small unit time period.

6. The method as claimed in claim 1 or claim 2 wherein said function of the velocity signal is a continuous function of the load velocity, and wherein the value of the function approaches zero as the load velocity approaches infinity and wherein the value of the function has a finite positive value when the load velocity has a zero value.

7. The method as claimed in claim 1 or claim 2 wherein the motor comprises a positional servo motor.

8. A positional control system to control a motor for driving a load in response to a position command signal which defines a desired load position, the system comprising:

first generating means for generating a position feedback signal related to the position of the load;

second generating means for generating a velocity signal related to the velocity of the load;

first combining means for combining the position command signal and the position feedback signal to obtain a position error signal;

calculating means for calculating a first control signal related to the position error signal;

integrating means for integrating the position error signal multiplied by a function of the velocity signal to obtain a second control signal; and second combining means for combining the first and second control signals to obtain an equivalent resultant control signal wherein, when the value of the load velocity is sufficiently high to overcome the effects of sticktion on the motion of the load, the contribution of the second control signal to the resultant control signal is negligible and wherein the second control signal only makes a significant contribution to the resultant control signal when the value of the load velocity is at such a level that sticktion impinges on the motion of the load.

9. In a control system including a PD type of controller for controlling a motor for driving a joint of a robot by providing a first control signal related to a position error signal, the improvement comprising:

first generating means for generating a velocity signal related to the velocity of the load;

integrating means for integrating the position error signal multiplied by the function of the velocity signal to obtain a second control signal; and combining means for combining the first and second control signals to obtain an equivalent resultant control signal, wherein when the value of the load velocity is sufficiently high to overcome the effects of sticktion on the motion of the load, the contribution of the second control signal is negligible and wherein the second control signal only makes a significant contribution to the resultant control signal when the value of the load velocity is at such a low level that sticktion impinges on the motion of the load.

10. The invention as claimed in claim 8 or claim 9 wherein said integrating means operates in a recursive fashion.

11. The invention as claimed in claim 8 or claim 9 wherein said integrating means operates in a digitally recursive fashion.

12. The invention as claimed in claim 8 or claim 9 wherein the function of the velocity signal is a continuous function of the load velocity, the value of the function approaching a value of zero as the value of the load velocity approaches infinity and wherein the value of the function has a finite positive value when the load velocity has a zero value.

13. The invention as claimed in claim 8 or claim 9 further comprising means for generating a velocity error signal related to the value of the velocity of the load and means for combining the velocity error signal and the resultant control signal to obtain an input control signal to be coupled to a motor drive circuit of the motor.

* * * * *